(12) United States Patent
Chang et al.

(10) Patent No.: US 6,370,594 B1
(45) Date of Patent: Apr. 9, 2002

(54) METHOD FOR TESTING DATA PINS OF A PARALLEL COMMUNICATION PORT

(75) Inventors: Yu-Chuan Chang, Taipei (TW); Xue-Ning Ren, Shanghai (CN)

(73) Assignee: Inventec Corp., Taipei (JP)

( * ) Notice: Subject to any disclaimer, the term of this patent is extended or adjusted under 35 U.S.C. 154(b) by 0 days.

(21) Appl. No.: 09/217,312

(22) Filed: Dec. 18, 1998

(51) Int. Cl.[7] .......................... G06F 13/14; G06F 13/20
(52) U.S. Cl. .............................. 710/3; 714/25; 714/40; 714/41; 714/43; 714/46
(58) Field of Search ........................... 710/1, 3; 714/25, 714/40, 41, 43, 46

(56) References Cited

U.S. PATENT DOCUMENTS

| | | | | |
|---|---|---|---|---|
| 5,432,797 A | * | 7/1995 | Takano | 371/27 |
| 6,058,495 A | * | 5/2000 | Lee et al. | 714/718 |
| 6,118,711 A | * | 9/2000 | Merritt | 365/200 |
| 6,178,532 B1 | * | 1/2001 | Pierce et al. | 714/718 |
| 6,205,096 B1 | * | 3/2001 | Yeo et al. | 369/53.12 |
| 6,243,307 B1 | * | 6/2001 | Kawagoe | 365/201 |

* cited by examiner

Primary Examiner—Thomas Lee
Assistant Examiner—Rehana Perveen
(74) Attorney, Agent, or Firm—W. Wayne Liauh

(57) ABSTRACT

A method for testing n data pins of a parallel communication port. It includes the main steps of: (a) selecting an address to access a memory unit; (b) selecting a data pin to be tested and a testing data, wherein the testing data is a binary code consisting of (n—1) of first binary digits at data pins other than the data pin being selected and a second binary digit at the data pin being selected, the first binary digit being different from the second binary digit; (c) writing the testing data into the memory unit through all the data pins; (d) reading a stored data from the memory unit also through all the data pins; and (e) comparing the testing data with the stored data to diagnose the data pins, then storing the result into computer memory. The step of diagnose the data pins comprises the sub-steps of: (i) checking to see whether the binary digit of the stored data at the selected data pin is the same as the binary digit of testing data, if no, the selected data pin is open, if not, proceeding to step (ii); and (ii) checking to see whether there exists another data pin at whose location the binary digit is the same as the binary digit of the selected data pin, if yes, then there is a short circuit between the selected data pin and that data pin.

12 Claims, 10 Drawing Sheets

6,370,594 B1

METHOD FOR TESTING DATA PINS OF A PARALLEL COMMUNICATION PORT

BACKGROUND OF THE INVENTION

1. Field of the Invention

This invention is related to a communication port testing module and method thereof which are applied to test the work functions of the pins of the communication ports.

2. Description of Related Art

For extending to the functions, sockets are the basic setting of a computer. For instance, the PCMCIA (Personal Computer and Memory International Association, PCMCIA) communicated port of notebook computer is used to connect with cards such as MPEG card, FAX/Modem card and etc. and to extend the note book computer's function. No matter how these function extending cards need to be connected with the 68 pins of the PCMCIA communication port so that the data can be translated.

For insuring the data of translation process, these pins must be tested and make sure their function is fine. In the prior testing method, Sycard, a testing card will set in the communication port through what the testing process will be operated by the software in the computer to write/read specific data into selected memory division and determined the function of pins by a compare procedure. The test card includes a micro controller, a memory, voltage translator and speaker with 1K Hz. The testing procedure is separated into some functional groups including "Power On/Off", "Data Pattern", "Parity" etc. to test the pins.

The prior apply two main testing technique of methods The first is "55AA method". In this method, the data 55h and AAh will be written and read through the same pins. If the read data was the same with what be written, that prove the accessed pins are fine. The second method is to access any possible data. In other word, if we do to test 8 pins, there will test 256 times and 65536 time for 16 pins.

Being the information for determine whether the pins are open or short, the testing should be done for the each pins. Somehow, for the expensive cost and lousy testing times in the prior art, this invention submits a communication port of testing module and method thereof.

SUMMARY OF THE INVENTION

Therefore, an object of this invention to find out what situation the pins are. A testing module and method thereof are provided to test each pin.

This invention determines the condition, which may be open or short of pins on a testing communication port by comparing the written and read data generation form a write/read testing procedure on a memory unit which is connected to the testing communication port through the pins.

The invention applying a testing controller, a general array logic, a memory unit, and a connection port. Wherein according to a true value table, with the general array logic unit can generates CS signals (Chip Select Signals) by what the common memory and attribute memory in the memory unit can be accessed to resemble the write/read procedures. During the test process, specific data generated by "Walk 0" and "Walk 1" is sent through the pins of a testing communication port in which connected with the testing module. The pins are diagnosed by comparing the written and read data.

BRIEF DESCRIPTION OF THE DRAWINGS

Other objects, features plus the advantages of invention will become apparent from the following detailed description of the preferred, nevertheless non-limiting embodiments. The description made with reference to the accompanying drawings in which.

DETAIL DESCRIPTION OF THE INVENTION

This embodiment is performed on a PCMCIA Port of a notebook PC. For a better understanding to this embodiment, the definitions of some items are firstly explained in the following.

Walk 0: It's a dynamic binary data form: It begins from setting the last significant bit, LSB, to be "0" and others to be "1" in first cycle, therewith set the second bit to be "0" together others to be "1" with the next cycle, which won't stop until the most significant bit . 'MSB' is set to be "0". During this procedure, "0" is moved from the first one to the last, it looks like "0" takes a walk. That's why this procedure is called "Walk 0".

Walk 1: This procedure is similar to "Walk 0", the only difference between them is setting the selected bit "1", others to be "0" and looks like have a "1" moved from the first bit to the last.

: The "low voltage" mark of pins and signal lines which will work when their voltage is low.

D0–D15: The samples of the 16 data lines of PCMCIS Port which can translate 16 bits information.

A0–A25 : The 25 address lines of the PCMCIA Port which are used to control memory address.

xxxxxb: A series of binary data.

xxxxxh: A series of hex data.

Figure 1:
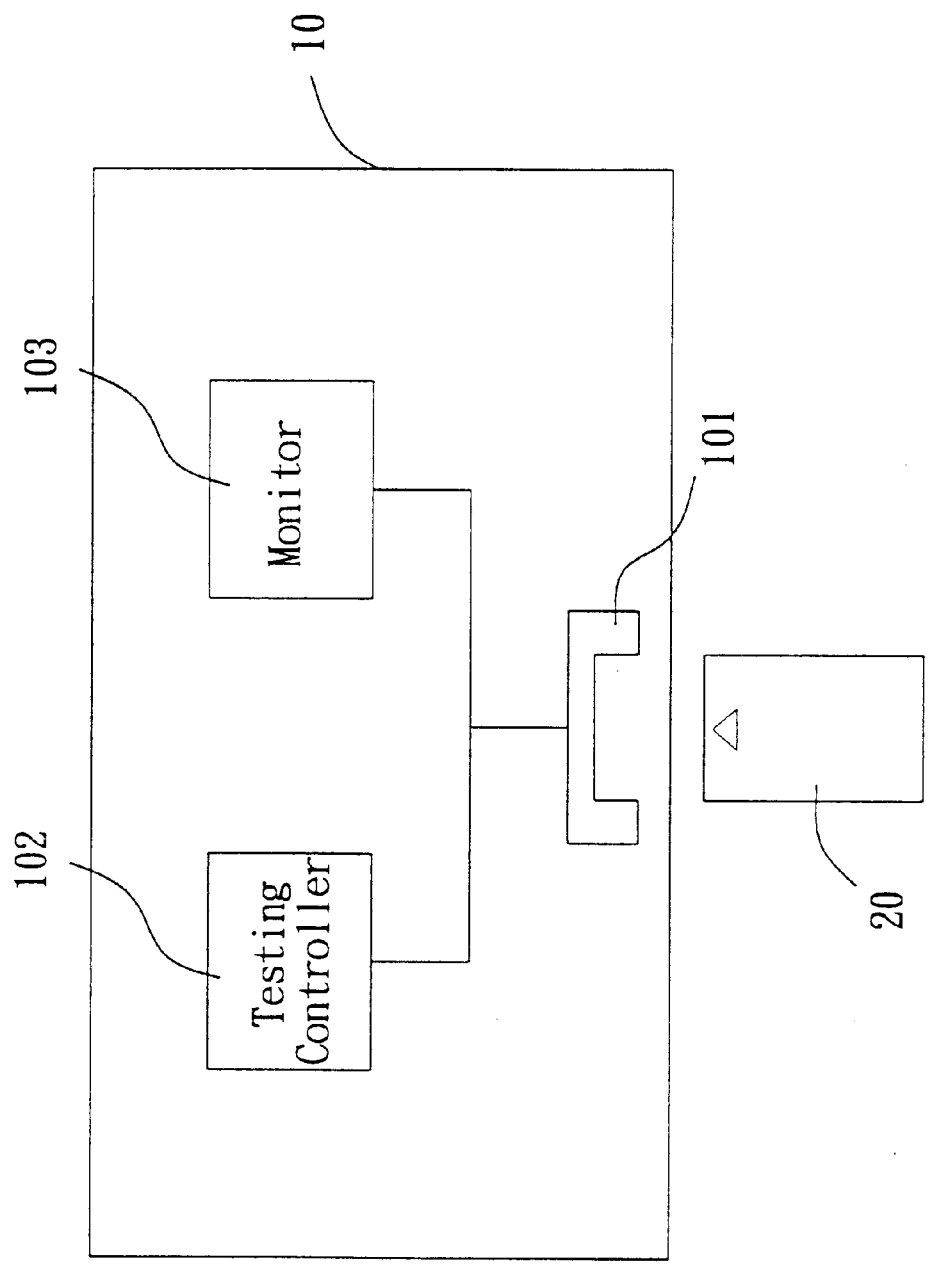
FIG. 1 shows the schematic connection view.

In FIG. 1, a notebook PC 10 has a PCMCIA Port 101 physically connected with a testing module 20. A testing controller 102 of the notebook PC controls the testing procedure then send the testing result to the monitor of the note book PC.

Figure 2:
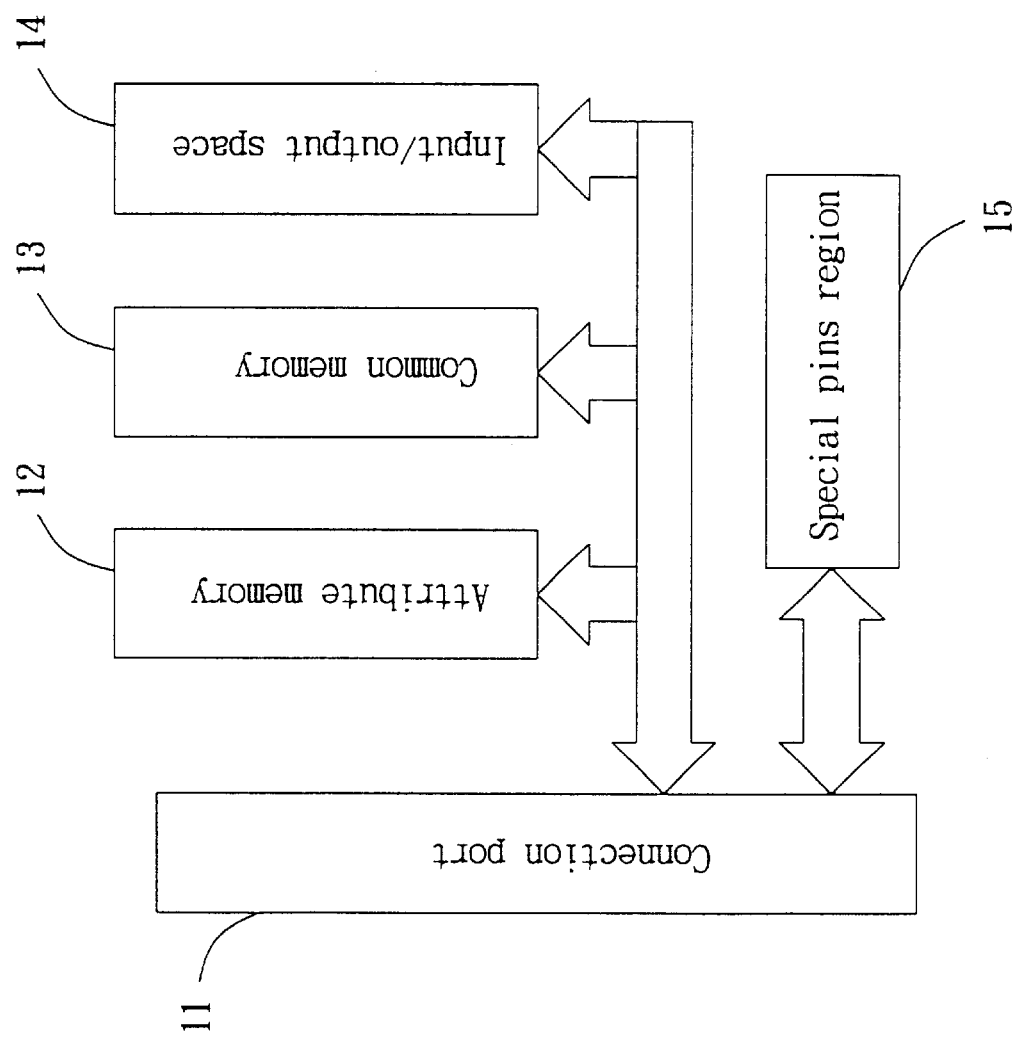
FIG. 2 shows the function block of the testing module.
Figure 3A:
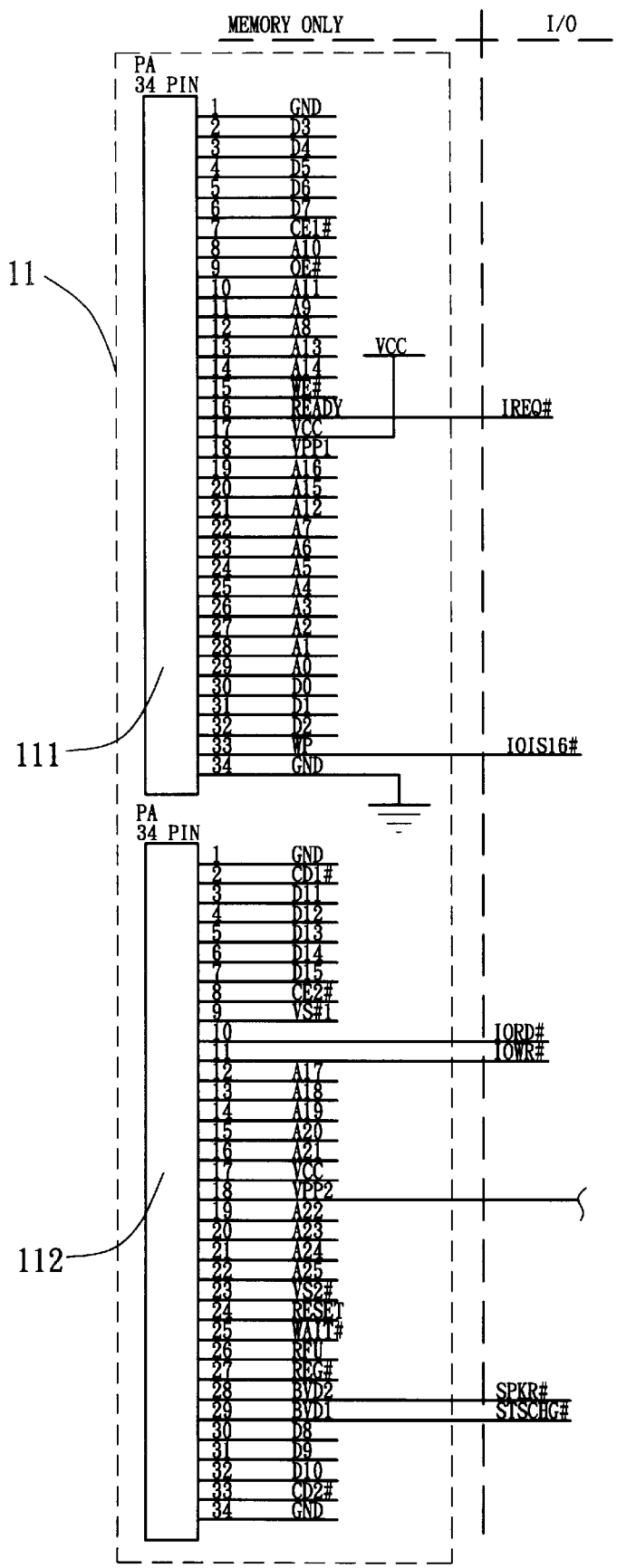
FIG. 3 shows the structure of the testing module.
Figure 3B:
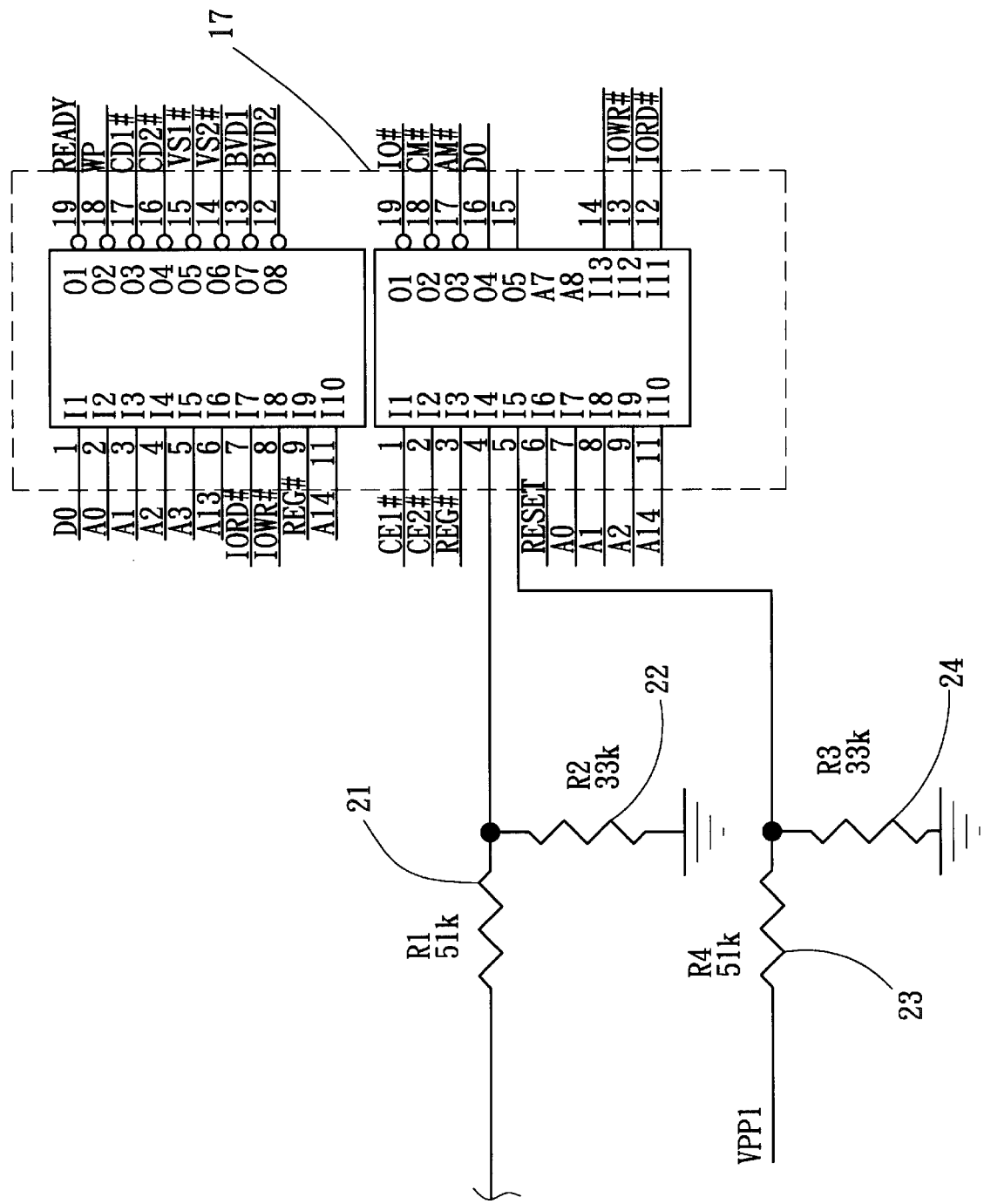
Figure 3C:
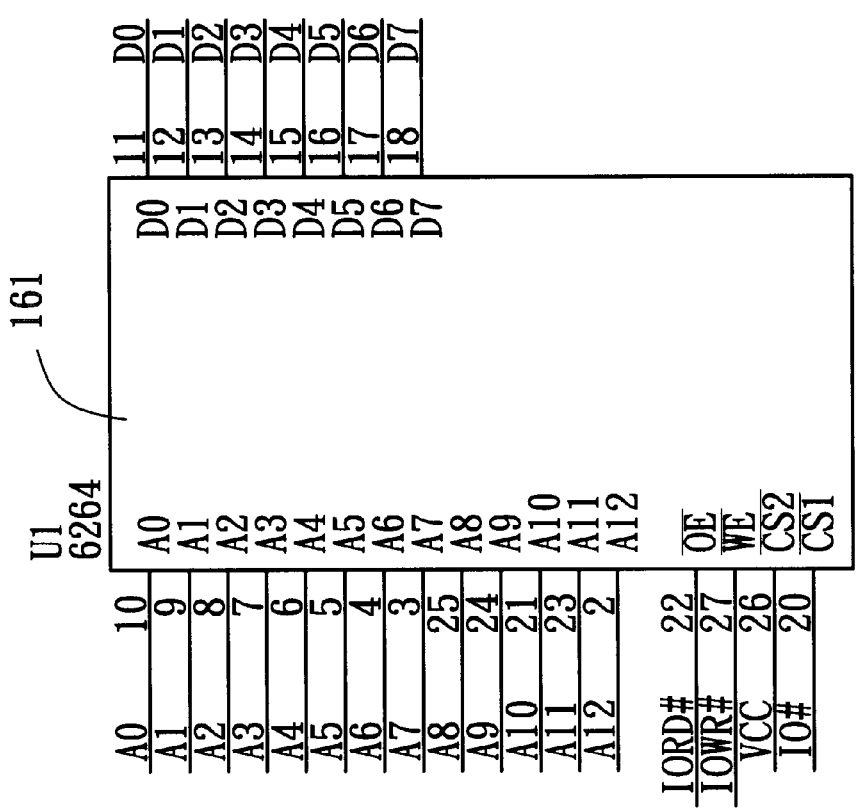
Figure 3D:
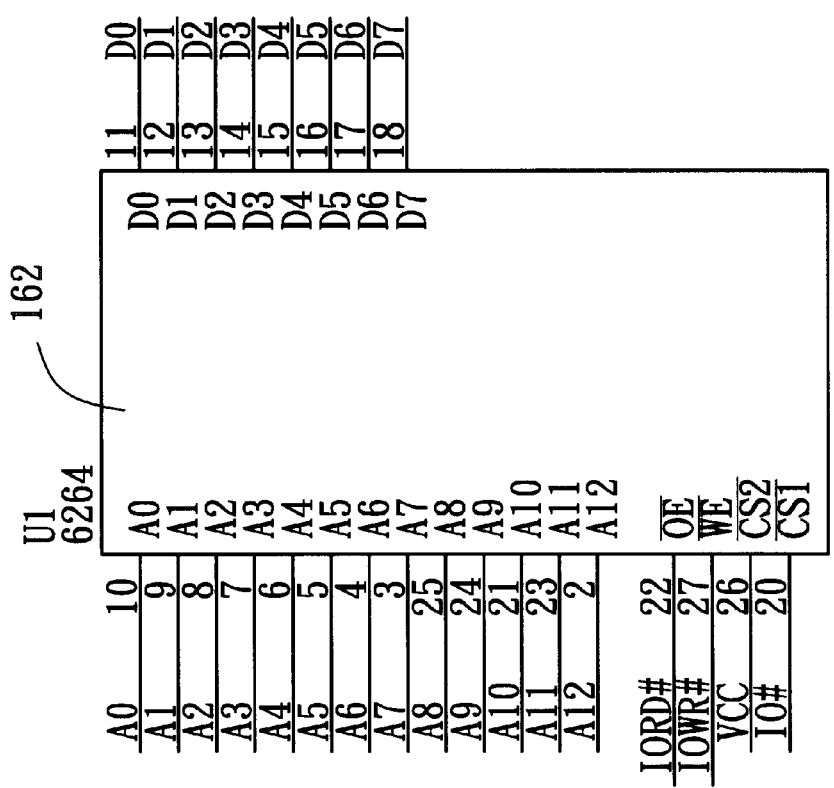
Figure 3E:
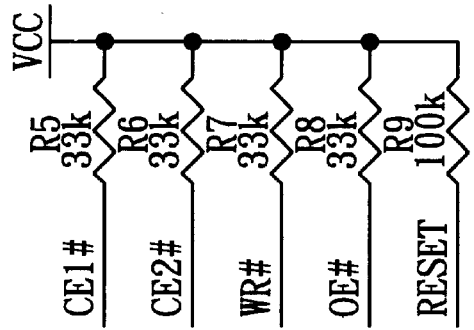
Figure 3E:
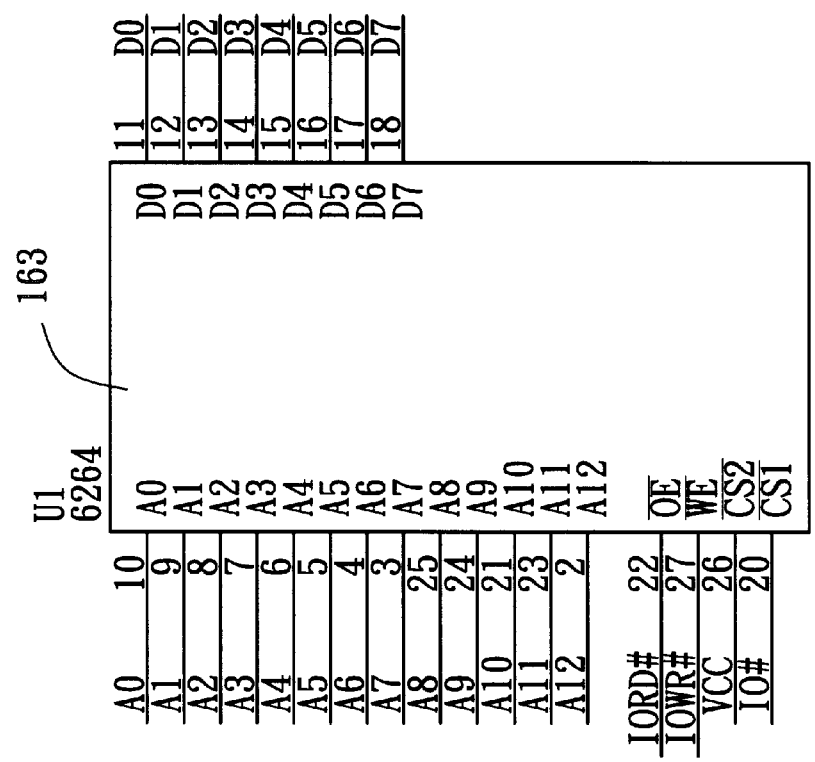

In FIG. 2, the testing module includes a connection port 11, an attribute memory 12, common memory 13, input/output space 14 and a special pins region 15. In FIG. 3, the structure of testing module, the first pin array 111 and second pin array 112 construct the connection port 11. Three SRAM units 161, 162, 163 are served as the attribute memory 12, the common memory 13 and input/output space 14. In general array logic (GAL) 17, by setting the voltage showed in table (1) and table (2) to generate chip select signals, controls these SRAM 161~163 to resemble the write/read process on the attribute memory 12, the common memory 13 and input/output space 14. The register 171 (special pins region 15) of GAL 17 is for the write/read procedure of special pins. However, the general array logic can exchange by a micro controller.

TABLE 1

| Cycle | Pin | | | |
|---|---|---|---|---|
| | IORD# | IOWR# | OE# | WE# |
| I/O read | Low | High | X | X |
| I/O write | High | Low | X | X |
| Memory read | X | X | Low | High |
| Memory write | X | X | High | Low |

TABLE 2

| Access Unit | Pin | | |
| --- | --- | --- | --- |
|  | REG# | CE2# | CE1# |
| Common Memory | High | Low | Low |
| Attribute Memory | Low | Low | Low |
| I/O | Low | Low | Low |

Figure 4:
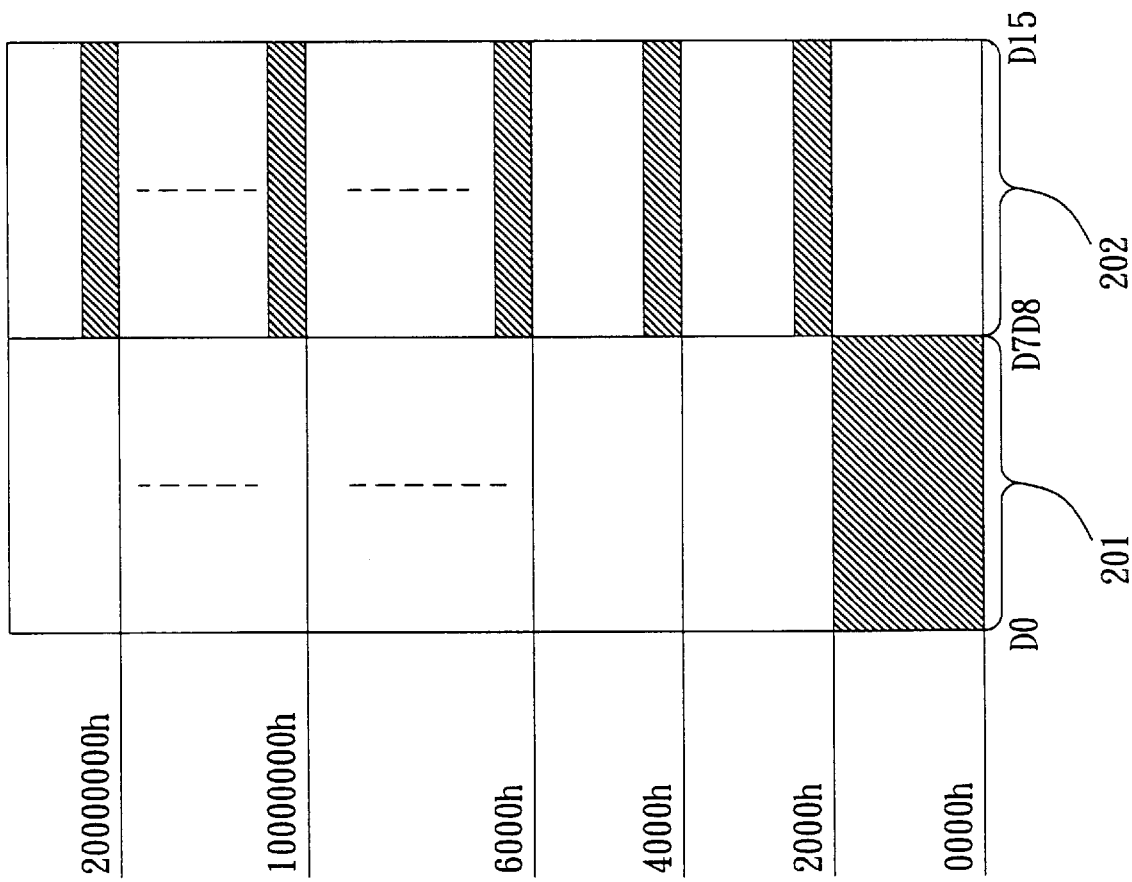
FIG. 4 shows address view of the memory.

The pins D0–D7 and A0–A12 of the first pin array 111 and second pin array 112 are connected to SRAM 161 and 162. The pin's D8–D15 and A13–A25 are connected to SRAM 163. So the responding addresses to the memory in the testing module is similar FIG. 4. The memory settlement from 0000h to 2000h is continuous, showed as low byte region 201. The high byte region 202 is not continuous but step like by 2000h.

Figure 5:
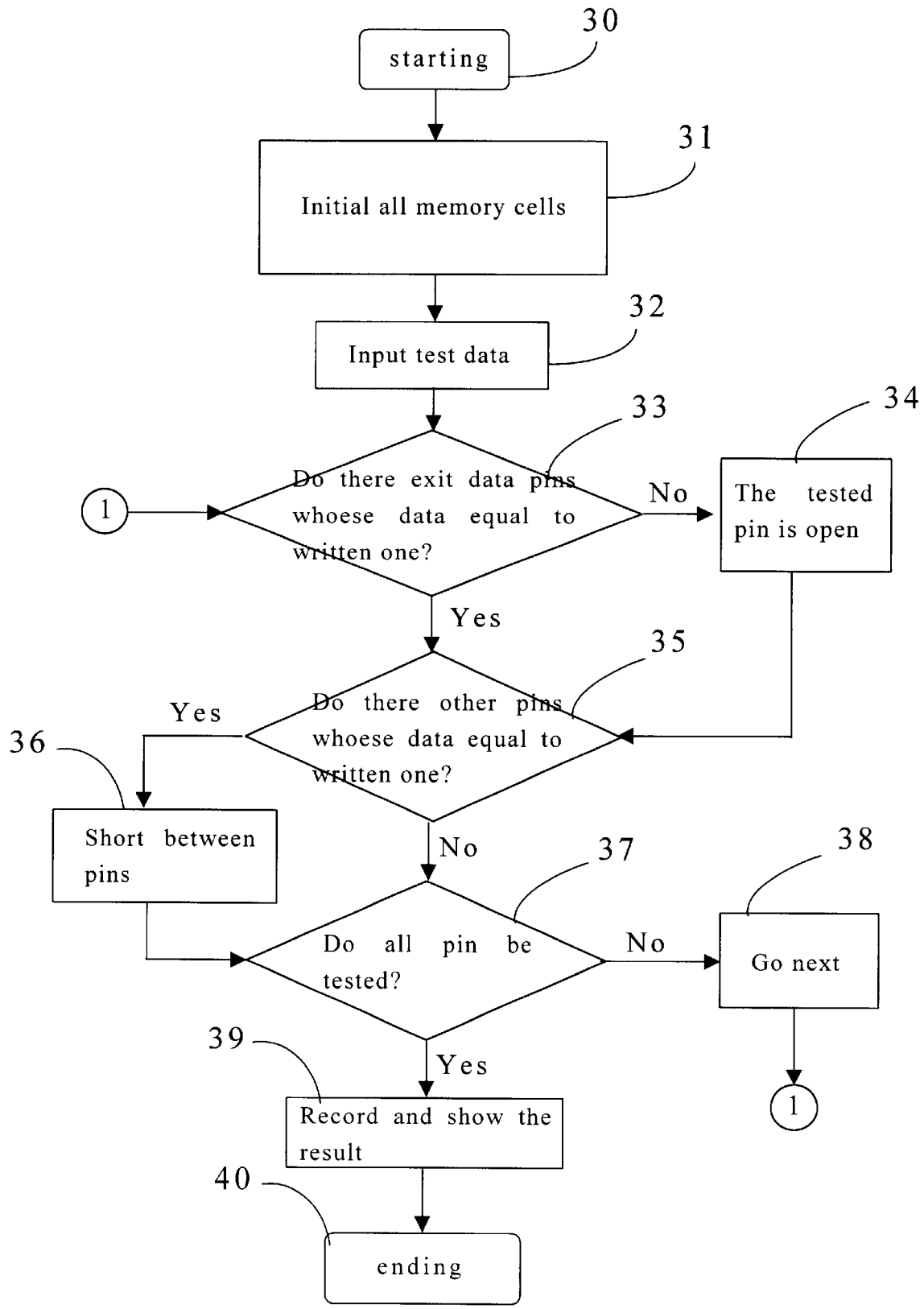
FIG. 5 shows the testing flow of the data pins.

FIG. 5 is the testing flow of data pins. Assume the open pin is floating which may be high voltage or low voltage:
1. The Test of D0–D7

First select a address from 0000h~2000h and fit on it. Generate the testing data (step 31) by "Walk 0" and 'Walk 1" which will like "11111110b"~"01111111b" and "00000001b"~"10000000b". Write the testing data, such as 11111110b, through D0–D7 to the memory registered by the selected address (see step 32) and then read it out. If the read data is the same with the written one, it means D0 is just fine. Otherwise, if the written data is 11111110b but read data is 11111111b, that means the pin D0 is open (see step 34). Or maybe the written date is 11111110b bur the read one is 11110110b (see step 35). By which we diagnosis the pin D0 is short with D3 (see step 36) and the testing controller 102 will remark the unusual pins. And consider if all the pins were tested (see step 37). If not, go next (see step 38). So, by running the testing data generated by "Walk 0" and "Walk 1", every pins will be tested and restore its' situation.

And for the fixed memory address, these testing steps are run on the same place, even there may exist some defects on the address pins. So that this testing does not be effected by the situation of the address pins.
2. The Test of D8–D15

This test is similar to the one of D0–D7. The only difference is the selection of memory address which should come from 2000h, 4000h, . . . .

Absolutely, when the testing module 20 is informed the finish of the testing, the information of D0–D15 will be showed on the monitor 10 (see step 39) then ended the test.

The reasons of both Walk 0 and Walk 1 are applied are as following. First, when a pin of the PCMCIA Port 101 is open, its' voltage may be high or low. If it were in high voltage, walk 0 can show it out. In the other hand, if it were in low voltage, only Walk 1 can show it out. Second, when there are two or more pins are short together, their voltage will be the same. However, like the open pins, their voltage isn't identified. So that Walk 0 and Walk 1 should be held on.

Figure 6:
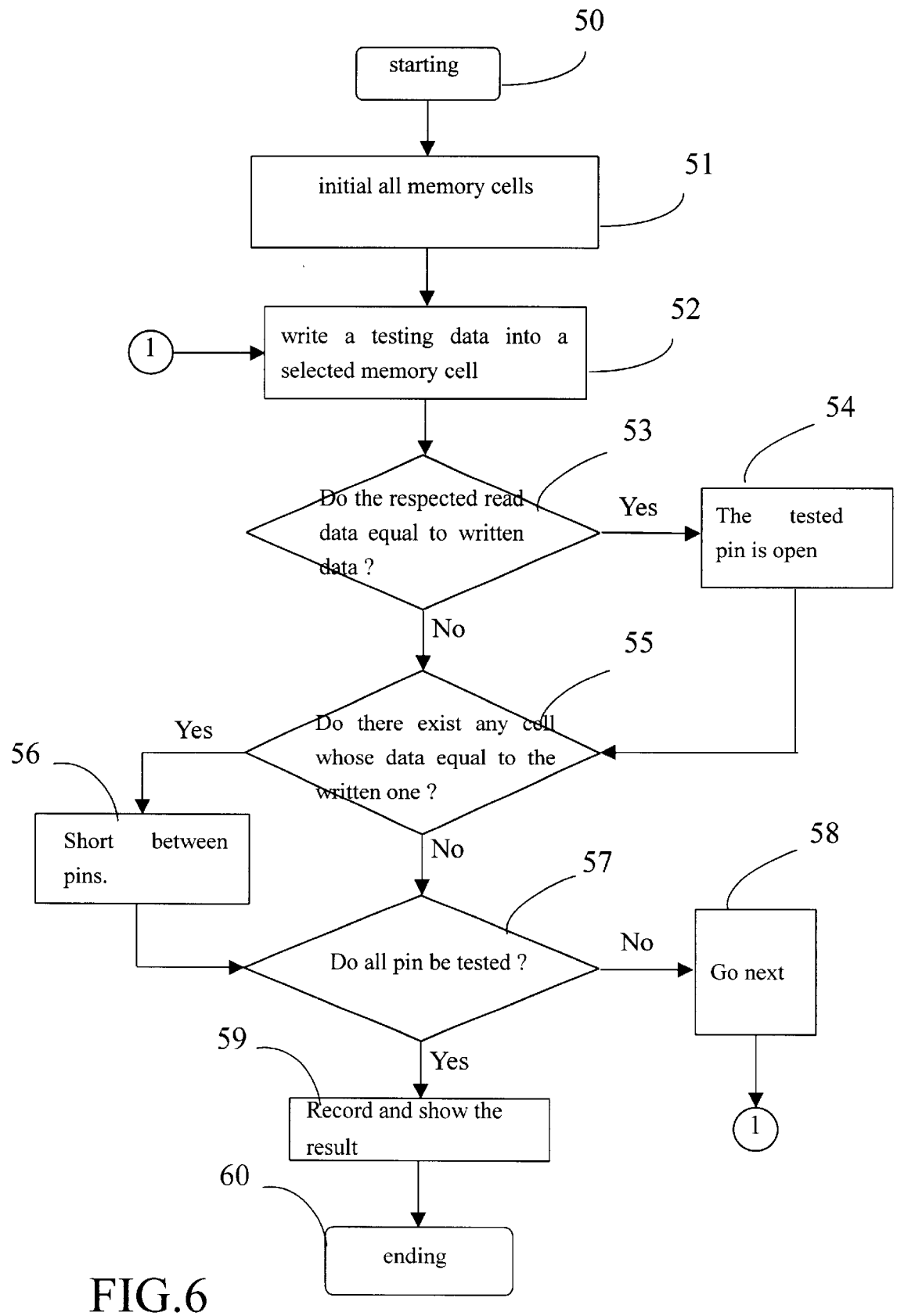
FIG. 6 shows the testing flow of the address pins.

FIG. 6 is the testing flow of the address pins. It simulates data pin testing, address pin testing is separated into two group.
1. The test of A0–A12

First, assuming the open pin is at low voltage, initiate the SRAM 161 and 162 which are connected A0–A12 and D0–D7; therefore, every memory unit is "00000000b". Continually a testing data "1111111b" is written in to a selected memory unit whose address is "0000000000001b" generated by Walk 1. Step 3 is to read all the data out and start up the diagnosis. Firstly, check the data in "000000000000b". If the A0 were open; therefore, the step 1 of the written data will be store in the memory unit "000000000000b" but not "0000000000001b". If the read data equal to the written one, that means A0 is open. Otherwise, it is functional. If A0 is short with other pin(s), the testing data "11111111b" will be stored in other respected memory unit. By checking all the data in every memory units, the situation of the pins will be find out.

As described above, the floating pin may by higher or lower, On that account both of Walk 1 and Walk 0 will be held.
2. The Test of A13–A25

This test is similar to the one of A0–A12. The only difference is the testing procedure held on SRAM 163.

The special pins works as control signal pins or power pins.

CD1#, CD2#: Card Detect which is used to detect the function card insertion to PCMCIA Port 101.

VS1#, VS2#: Voltage Sense, used to test the power supply level of the inserted function card.

BVD1, VBD2: Battery Voltage Detect, used to detect the battery of the inserted function card.

VPP1, VPP2: These pins are used to supply the Programming Voltage.

RESET : To reset the inserted of function card.

The register 171 of GAL 17 has conjunct memory region for these special pins to prosecute the write/read testing procedure. In FIG. 3, resistors 21~24 are connected with VPP1 and VPP2 for loading the high voltage of VPP1 and VPP2 down.

The setting value of these special pins will transmit to the register then read out from the tested data pins to check what the register really received. By comparing the setting value and the read data, the special pins can be diagnosis. The result will be sent to the monitor of the notebook PC.

It is notice that the telephony tester described above are the preferred embodiments of the present invention for the purposes of illustration only, and are not intended as a definition of the limits and scope of the invention disclosed. Any modifications and variations that may be apparent to a person skilled in the art intended to be included within the scope of the present invention.

What is claimed is:

1. A method for testing data pins of a communication port, wherein said data pins are parallelly arranged and said method comprises the steps of:
   a) selecting an address to access a memory unit;
   b) selecting a data pin to be tested and a testing data, wherein the testing data is a binary code consisting of (n−1) of first binary digits, n being the total number of data pins, at data pins other than the data pin being selected and a second binary digit at the data pin being selected, the first binary digit being different from the second binary digit;
   c) writing the testing data into the memory unit through the data pins;
   d) reading a stored data from the memory unit through the data pins; and
   e) comparing the testing data with the stored data to diagnose the data pins, then storing the result into computer memory;
   f) wherein the step of diagnose the data pins comprises the sub-steps of:
      i) checking to see whether the binary digit of the stored data at the selected data pin is the same as the binary digit of testing data, if no, the selected data pin is open, if not, proceeding to step ii); and ii) checking to see whether there exists another data pin at whose location the binary digit is the same as the binary digit of the selected data pin, if yes, then there is a short circuit between the selected data pin and that data pin.

2. The method according to claim 1, wherein said address is corresponding to a memory element.

3. The method according to claim 2, wherein said memory element comprises an attribute memory, a common memory, and an input/output space.

4. The method according to claim 1, wherein said testing data is generated by means of Walk 0.

5. The method according to claim 1, wherein said testing data is generated by means of Walk 1.

6. The method according to claim 1, wherein said computer memory in step e) is a hard disk.

7. A method for testing address pins of a communication port, comprising steps of
   a) selecting an address pin from a plurality of addresses pins to be tested;
   b) selecting a testing data, wherein the testing data is a binary code consisting of (n−1) of first binary digits, n being the total number of data pins, at address pins other than the address pin being selected and a second binary digit at the address pin being selected, said first binary digit being different from said second binary digit;
   c) writing the testing data into a memory unit in accordance with the testing addresses;
   d) reading a stored data from the memory unit; and
   e) analyzing the stored data to diagnose the address pins, and storing the result into computer memory;
   f) wherein the step of diagnose the data pins comprises the sub-steps of:
      i) checking to see whether the binary digit of the stored data at the selected address pin is the same as the binary digit of testing data, if no, the selected address pin is open, if not, proceeding to step ii); and
      ii) checking to see whether there exists another address pin at whose location the binary digit is the same as the binary digit of the selected address pin, if yes, then there is a short circuit between the selected address pin and that address pin.

8. The method according to claim 7, wherein said memory unit comprises an attribute memory, a common memory, and an input/output space.

9. The method according to claim 7, wherein the step a) can be executed after step b).

10. The method according to claim 7, wherein said testing address is generated by means of Walk 0.

11. The method according to claim 7, wherein said testing address is generated by means of Walk 1.

12. The method according to claim 7, wherein said computer memory in step f) is a hard disk.

* * * * *